United States Patent [19]

Scott

[11] Patent Number: 5,339,612
[45] Date of Patent: Aug. 23, 1994

[54] SELF-ADJUSTING FORCE BALANCE RADIAL GRAPE AND RAISIN HARVESTER

[75] Inventor: Phillip R. Scott, Madera, Calif.

[73] Assignee: FMC Corporation, Chicago, Ill.

[21] Appl. No.: 937,087

[22] Filed: Aug. 31, 1992

[51] Int. Cl.⁵ .......................................... A01D 46/00
[52] U.S. Cl. ................................... 56/330; 56/328.1; 56/DIG. 2
[58] Field of Search ................ 56/328.1, 330, 331, 56/340.1, DIG. 2

[56] References Cited

U.S. PATENT DOCUMENTS

| | | | |
|---|---|---|---|
| 2,929,184 | 3/1960 | Lamouria | 56/331 |
| 3,777,463 | 12/1973 | Claxton | 56/330 |
| 3,822,537 | 7/1974 | Sell | 56/330 |
| 4,283,906 | 8/1981 | Scudder | 56/330 |
| 4,329,836 | 5/1982 | Scudder | 56/330 |
| 4,336,682 | 6/1982 | Orlando | 56/330 |
| 4,341,062 | 7/1982 | Scudder | 56/330 |
| 4,418,521 | 12/1983 | Orlando et al. | 56/330 |
| 4,432,190 | 2/1984 | Orlando | 56/1 |
| 4,860,529 | 8/1989 | Peterson et al. | 56/330 |
| 4,974,405 | 12/1990 | Littau | 56/330 |
| 4,976,094 | 12/1990 | Williamson et al. | 56/330 |
| 5,109,657 | 5/1992 | Devries | 56/330 |
| 5,113,644 | 5/1992 | Windemuller et al. | 56/330 |

Primary Examiner—Mark Rosenbaum
Assistant Examiner—John M. Husar
Attorney, Agent, or Firm—M. B. Lee; R. C. Kamp; R. B. Megley

[57] ABSTRACT

A self-adjustable mobile force balanced grape and raisin harvester is disclosed having a pair of driven oscillating shaker heads mounted on sub-frames enabling each shaker head to center itself on the row of grape vines being harvested even when the foliage of the vines are not aligned in a linear path. The harvester is also provided with a pair of stretchable belts mounted on interconnected plastic chain links for reliably transporting grapes or raisins to an elongated discharge conveyor which is positioned transversely when collecting and discharging grapes from the harvester and is pivoted parallel to the longitudinal axis of the vehicle when moving along roadways.

14 Claims, 7 Drawing Sheets

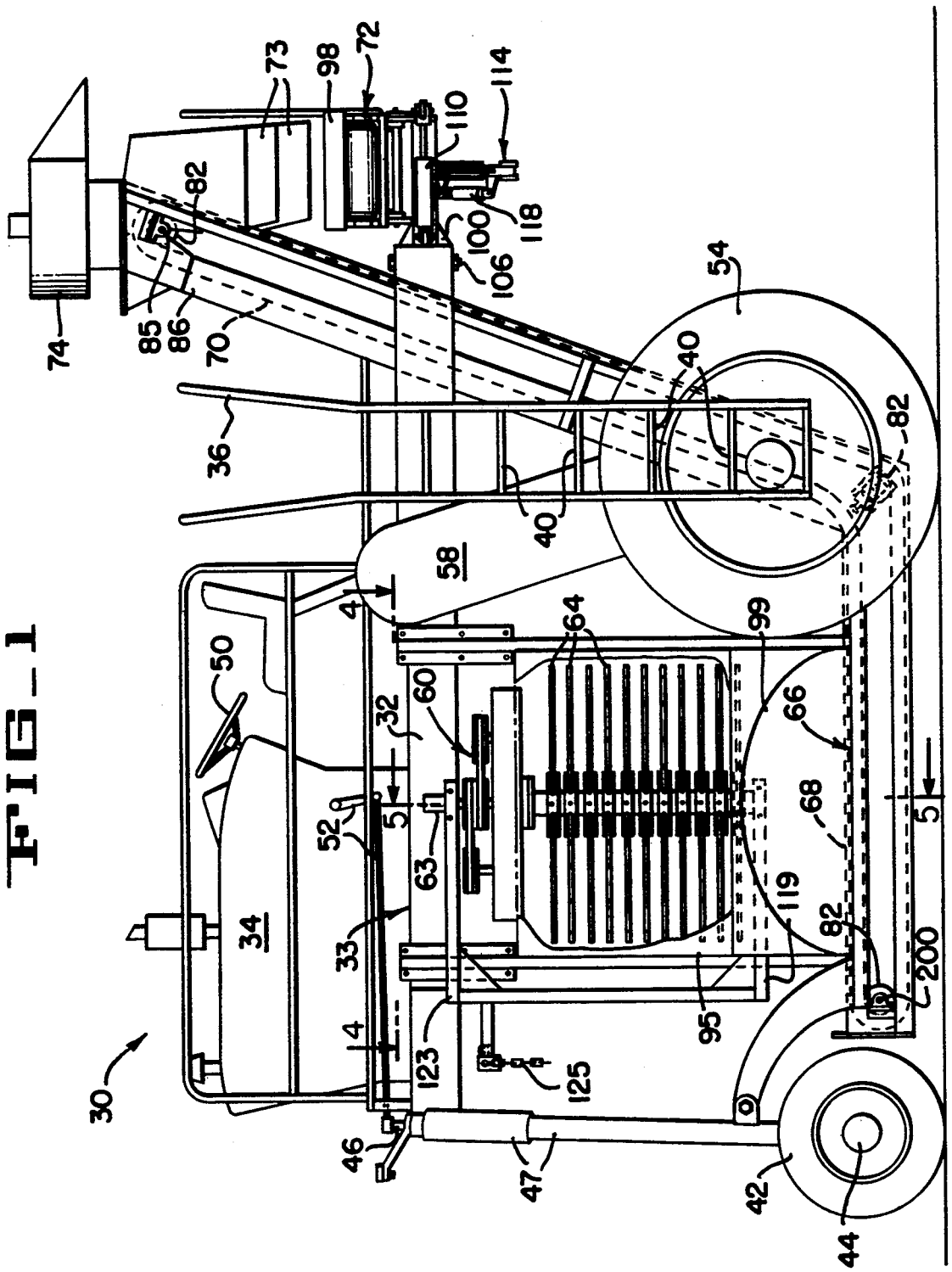

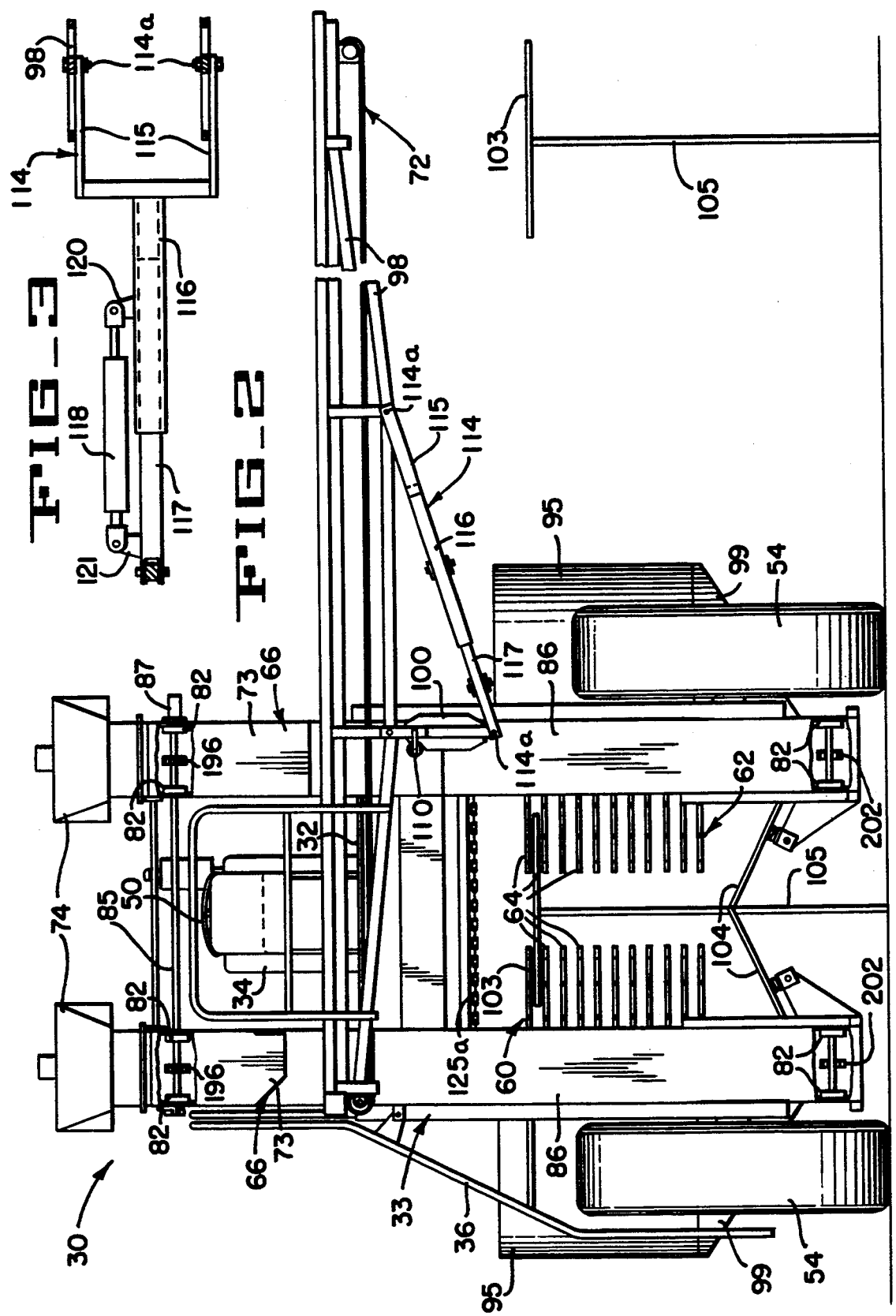

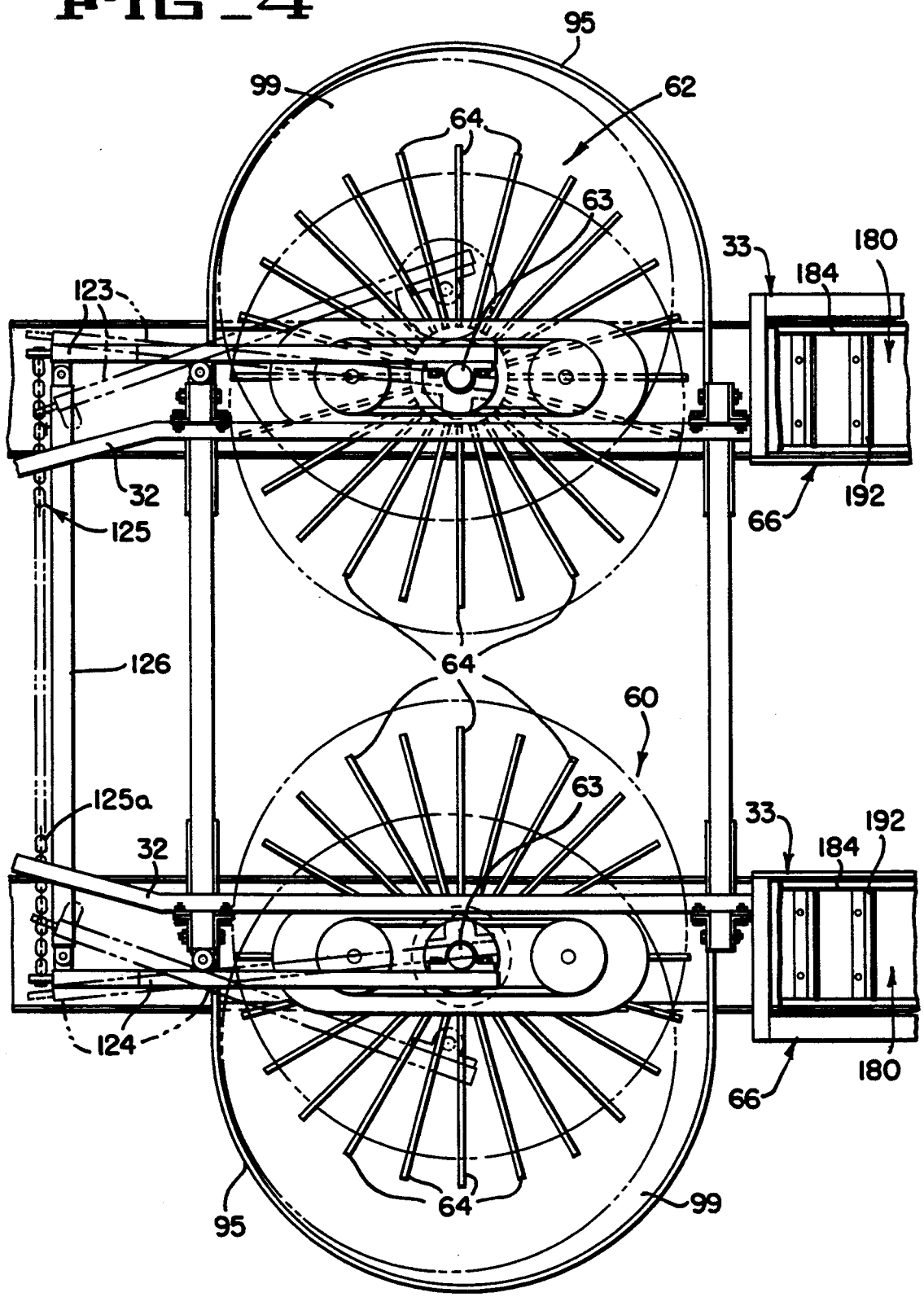

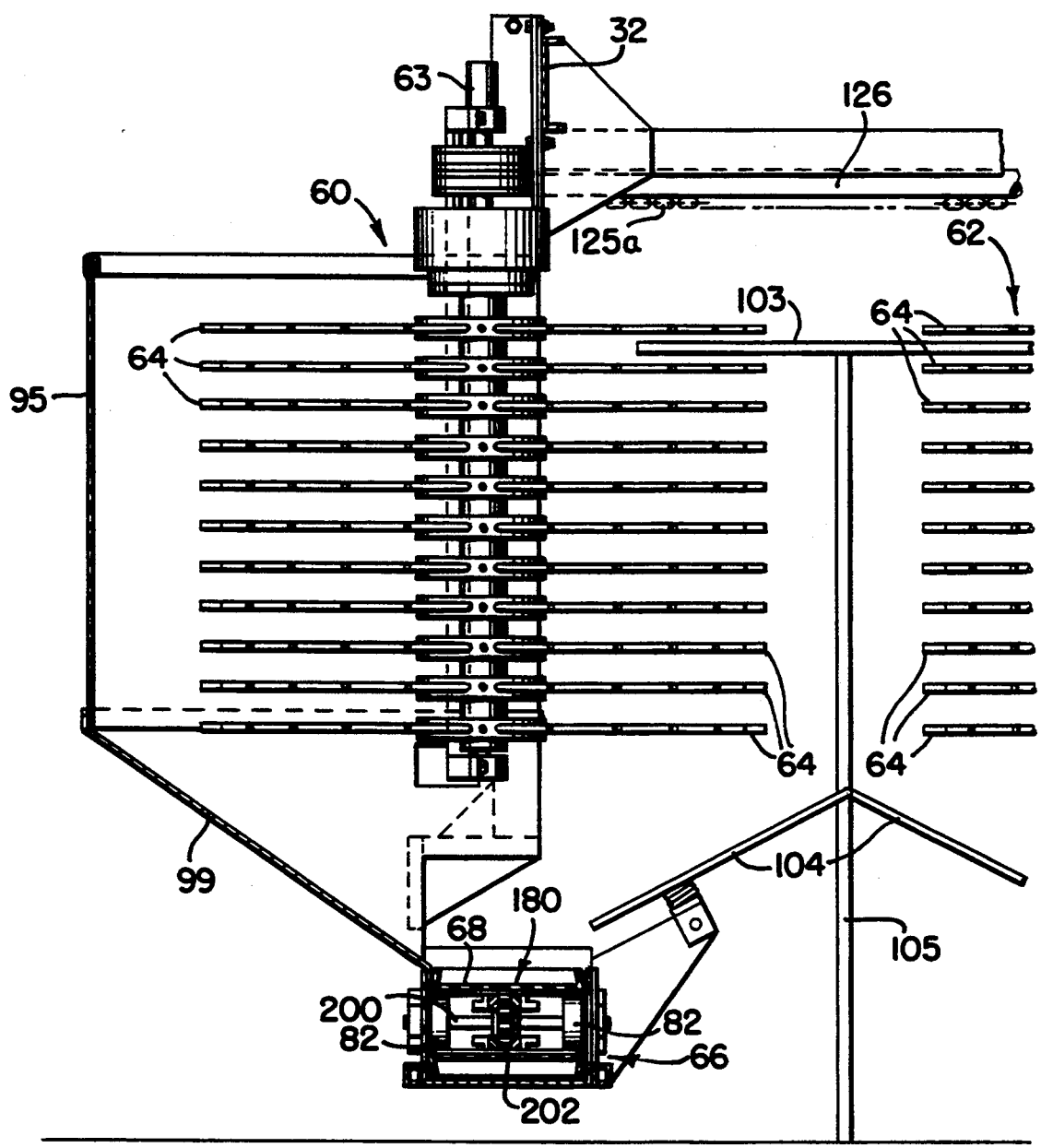
FIG_5

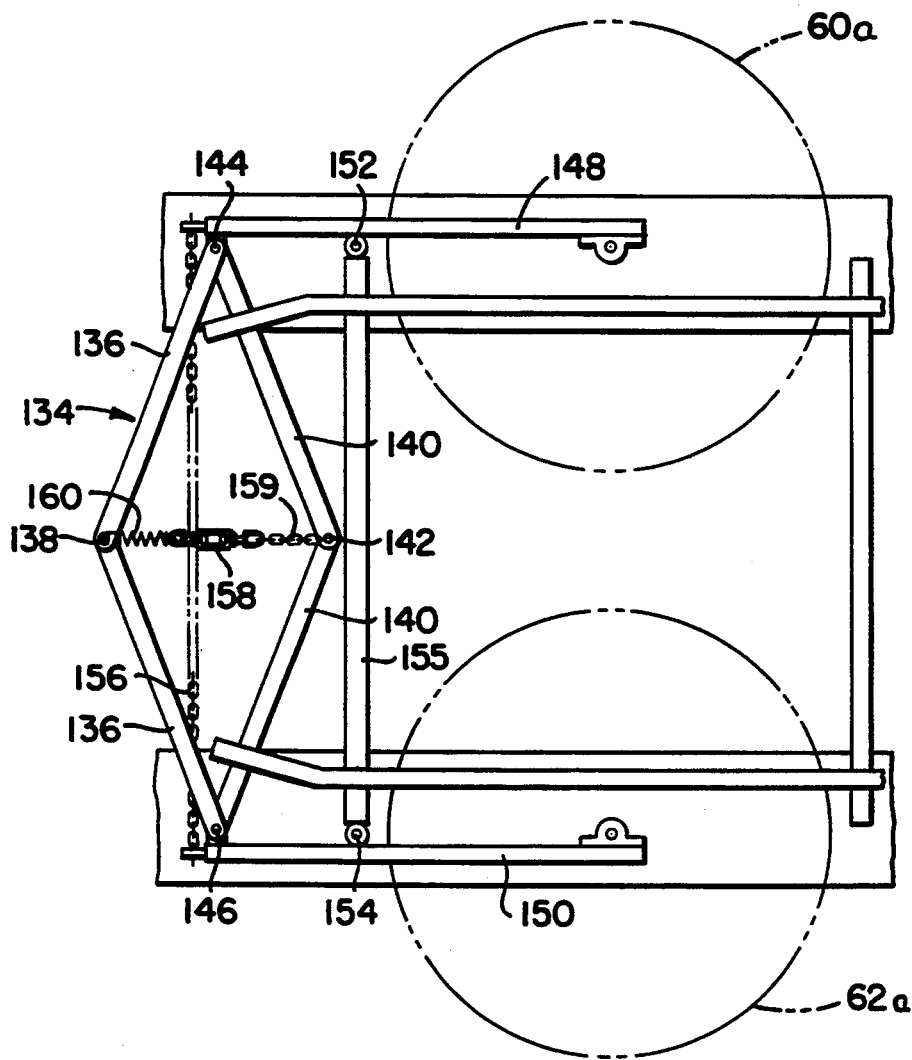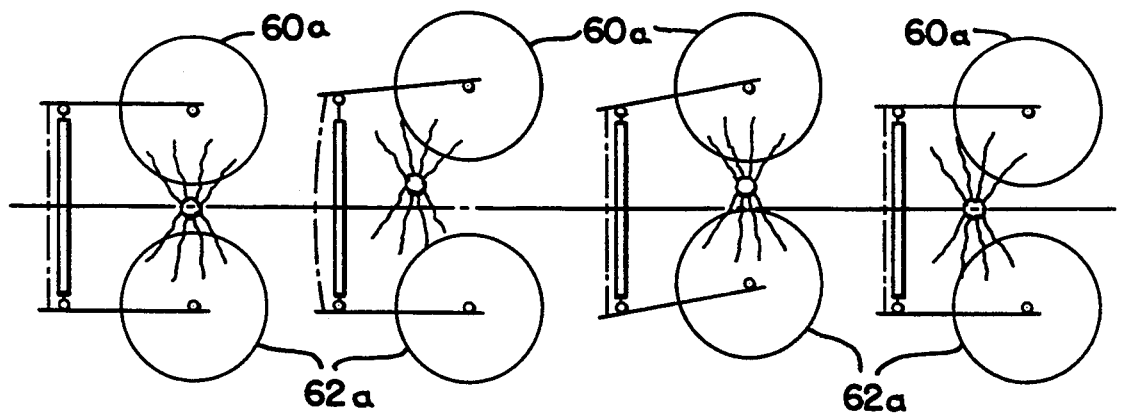

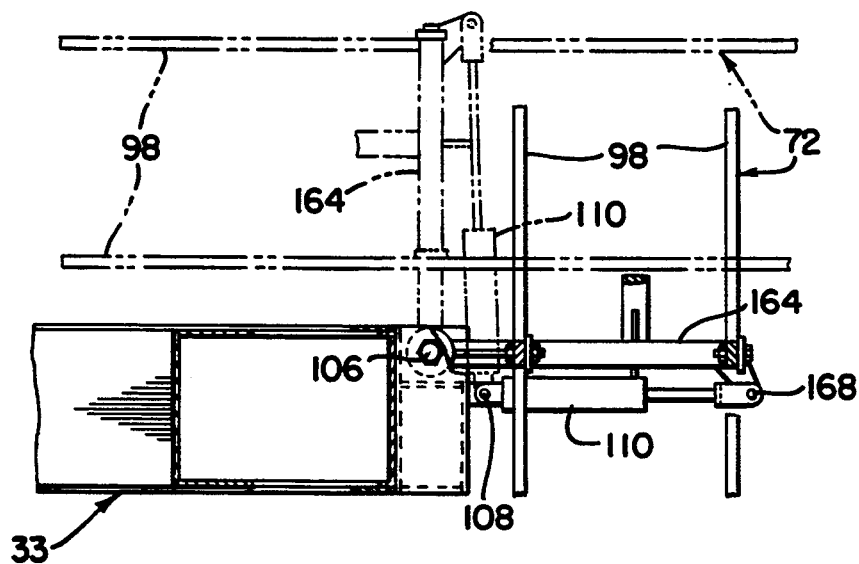
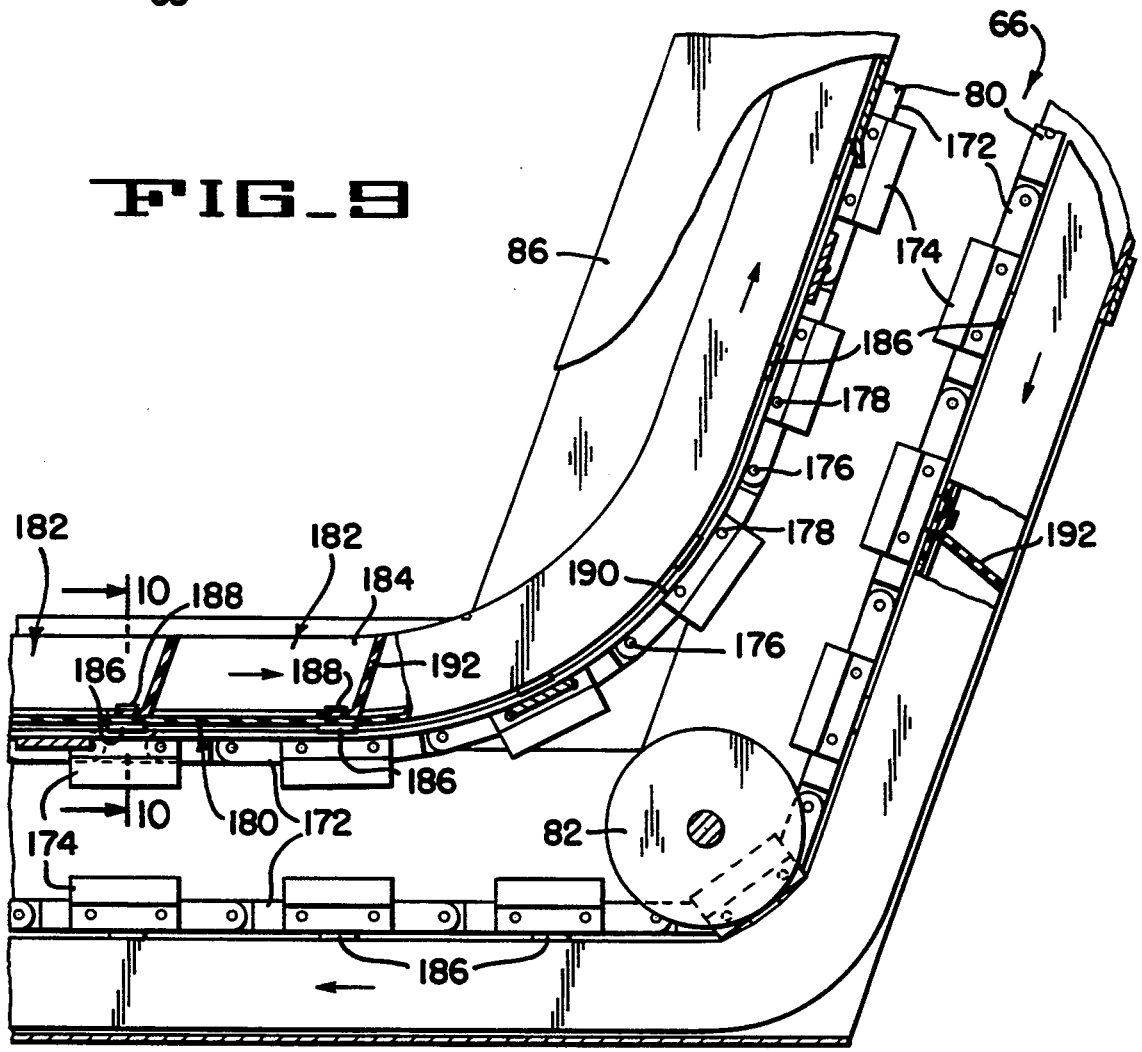

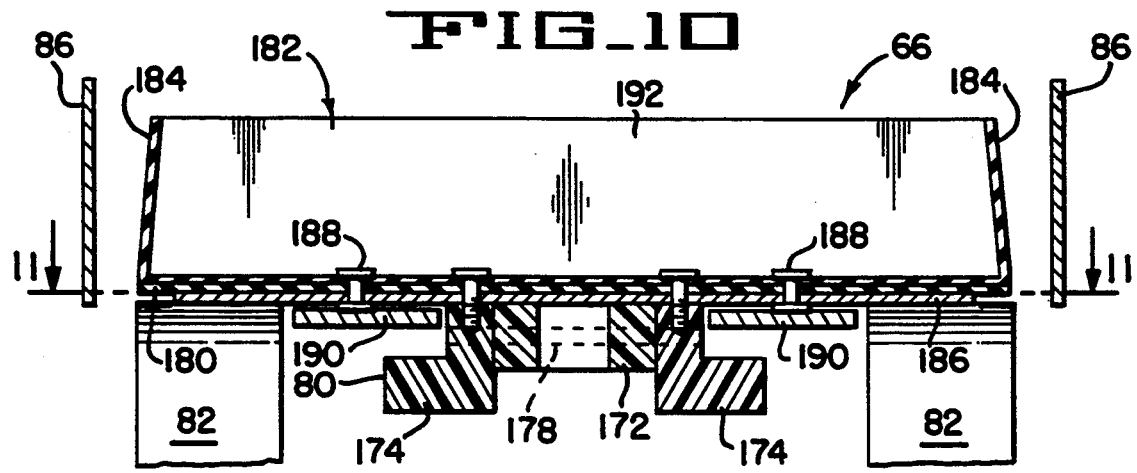
FIG_10
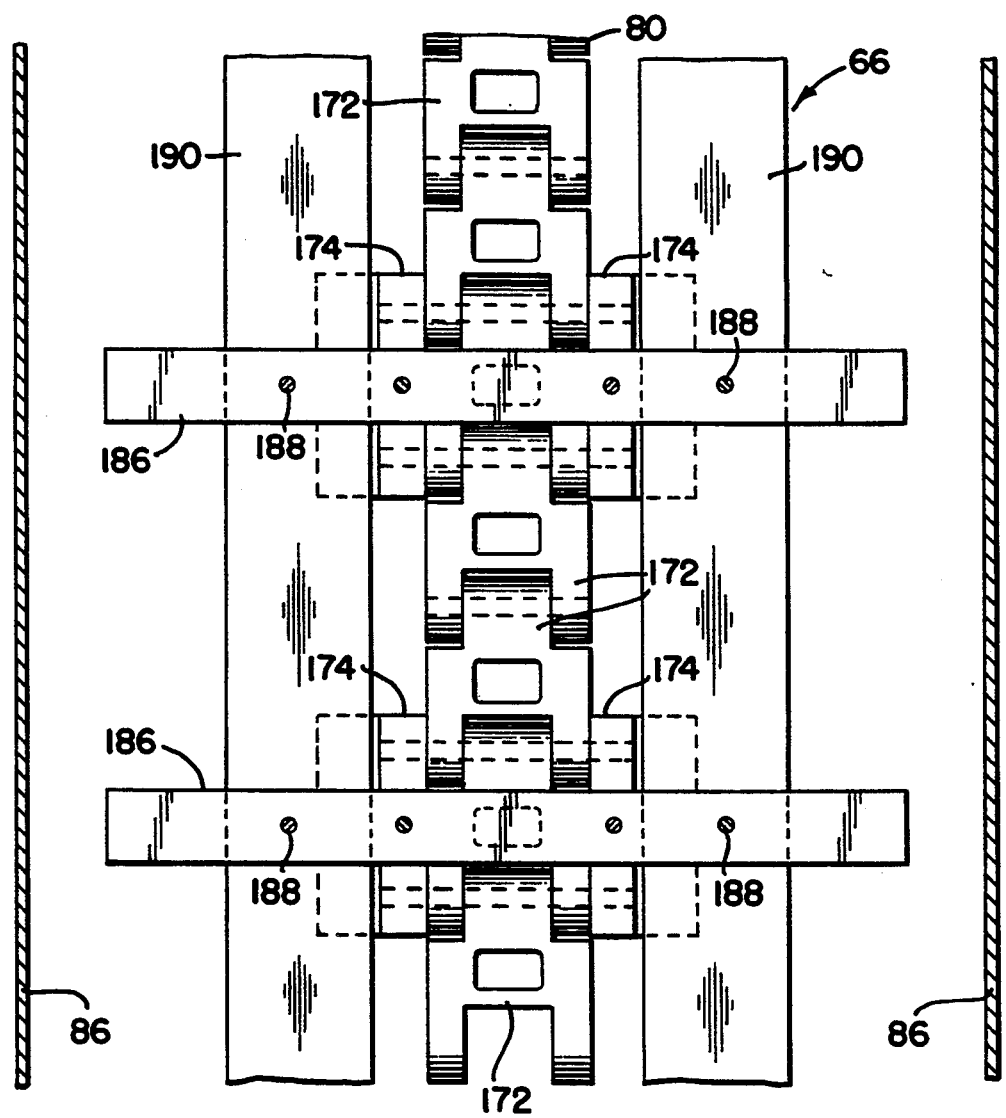
FIG_11

SELF-ADJUSTING FORCE BALANCE RADIAL GRAPE AND RAISIN HARVESTER

BACKGROUND OF THE INVENTION

1. Field of the Invention

The present invention relates to mobile grape and raisin harvesters and more specifically to harvesters for dry grapes which are supported on vines that are severed from the trunks of the vines and are left to dry in the sun while supported on the vines as raisins before being shook from the vines by the mobile harvester and collected by the harvester of the present invention. Alternately, the harvester can be used to remove grapes still attached to the vines and nourished by nutrients in the soil and be sold as wine grapes or grapes to be consumed by the public.

2. Description of the Prior Art

Assignee's Orlando U.S. Pat. No. 4,336,682 and divisional U.S. Pat. No. 4,432,190 covers an apparatus for shaking grapes from rows of vines by using eccentric weights which are mounted on shaker arms which have spaced elongated striker bars that are oscillated against the trunks of the grape vines and posts which support trellis wires that have clusters of grapes trained thereover which fall on take-away conveyors for transfer to collecting means.

Assignee's Orlando U.S. Pat. No. 4,418,521 is similar to the two above Orlando patents except that striker bars are used to resiliently whip foliage hanging from trellis wires which are supported by posts.

Assignee's Scudder U.S. Pat. No. 4,341,062 discloses a coffee harvester which utilizes an eccentric weight arrangement mounted on the upper ends of two shaker units for oscillating shafts carrying tines which dislodge coffee beans from the plants.

Assignee's Scudder U.S. Pat. No. 4,329,836 discloses a tractor drawn trailer having a vertical wall to which cantilever beams are pivotally connected. A single oscillating shaker unit is journaled in the two beams for moving the single oscillating shaker unit different distances from the vines being harvested. A pair of hydraulic cylinders are connected to rear wheels to maintain the axis of the shaker unit substantially vertical when harvesting fruit such as berries and coffee.

SUMMARY OF THE INVENTION

The present invention relates to improvements in grape and raisin harvesters and more particularly to grape harvesters for removing bunches of grapes supported on trellis wires. Alternately, the clusters of grapes may be supported on vines that have been severed from the trunks of the vines, but rest upon foliage supported by trellis wires that are secured to spaced posts. These clusters of grapes are left in the sun until they dry as raisins and are subsequently harvested by the grape and raisin harvester of the present invention for sale as raisins.

BRIEF DESCRIPTION OF THE DRAWINGS

FIG. 1 is a side elevation of a self-adjusting grape and raisin harvester of the present invention.

FIG. 2 is a rear elevation of the first embodiment of the self-adjusting grape and raisin harvester having a discharge conveyor positioned to receive the harvested grapes or raisins and discharge them over a second row of trellises into a truck or container.

FIG. 3 is a top view of a forked connector for maintaining the outer end of the discharge conveyor at a desired level when harvesting.

FIG. 4 is a section taken along lines 4—4 of FIG. 1 diagrammatically illustrating the two shaker heads self-aligning feature with grape vines that are not aligned with the centerline of the harvester.

FIG. 5 is a section taken along lines 5—5 of FIG. 1 illustrating one of the shaker heads and a portion of a second shaker head in position to harvest one row of grapes, and to direct the row of grapes or raisins into a longitudinal conveying system.

FIG. 6 is a diagrammatic plan view illustrating a second embodiment of two shaker heads but using a tensioning device which utilizes a turn buckle and a spring for controlling the spacing between the shaker heads.

FIG. 7 is an operational view illustrating several positions which the shaker heads may assume when harvesting vines that are not aligned in linear rows.

FIG. 8 is an operational view of the apparatus used for moving the discharge conveyor frame from a harvesting position shown in full lines and a transport position shown in phantom lines.

FIG. 9 is a sectional view of one of the longitudinal conveying systems with parts cut away.

FIG. 10 is a section taken along lines 10—10 of FIG. 9 illustrating several components of one of the conveying systems.

FIG. 11 is a horizontal section taken along lines 11—11 of FIG. 10.

DESCRIPTION OF THE PREFERRED EMBODIMENT

Having reference to the self-adjusting force balance radial grape and raisin harvester 30 (FIGS. 1 and 2) of the present invention illustrating an upper platform 32 on a main frame 33 which supports a conventional engine 34 with the usual controls for operating the engine. The engine and controls are supported on the upper platform 32 and are accessible by a ladder 36 connected to the upper platform 32 and having steps 40 (FIG. 1).

The upper platform 32 is partially supported by the main frame 33 and a pair of small steerable front wheels 42, only one being shown in FIG. 1. Each front wheel 42 is journaled on an axle 44 which is welded to an upright steering rods 46 (FIG. 1) that are pivotally connected to the upper platform 32 by tubes 47, only one being shown in FIG. 1. The steering rods 46 are connected to the steering wheel 50 of the harvester 30 through a conventional linkage 52.

As illustrated in FIGS. 1 and 2, a pair of large diameter drive wheels 54 are connected to the engine 34 by conventional drive systems which are modified to connect the gear box of the engine 34 to chain drives (not shown) within a pair of housings 58, only one housing being shown in FIG. 1.

As best shown in FIGS. 1 and 2, a pair of shaker heads 60 and 62 (FIGS. 1 and 2) are mounted on the main frame 33 of the harvester 30 which has a plurality of radially extending tines 64 that engage grapes or raisins and shake them free from the vines (not shown). Each shaking head 60 and 62 is driven by hydraulic motor 63, only one being shown in FIG. 1.

The shaker heads 60 and 62 (FIG. 2) are similar to those disclosed in Assignee's Scudder U.S. Pat. No. 4,341,062 which issued on Jul. 27, 1982, and is prior art to the subject application except that all of Applicant's tines 64 are substantially parallel to the ground.

As shown in FIGS. 1 and 2, the grape and raisin harvester 30 includes two longitudinal conveyor systems 66 (FIG. 1) with one system on each side of the harvester, which systems include an endless horizontal portion 68 and an upwardly inclined portion 70 which convey grapes and/or raisins to a discharge conveyor 72 (FIGS. 1 and 2). After passing through discharge chutes 73. Power driven blowers 74 are mounted on upwardly inclined elevator housings for blowing leaves or the like free from the grapes.

Each conveying system 66 (FIGS. 1 and 2) includes a plurality of plastic links 172 and 174 (FIGS. 9, 10 and 11) that are pivotally connected together by elongated bolts 176 and 178 (FIG. 9) defining an endless plastic chain 80 (FIGS. 10 and 11). End portions and intermediate portions of the plastic chain 80 (FIG. 10) are each trained around plastic wheels 82 (FIGS. 1 and 9), only one being shown within the chain 80 (FIG. 9). An upper chain supporting shaft 85 (FIG. 1) is journaled in each elevator housing 86, and is driven by a hydraulic motor 87 (FIG. 2).

As illustrated in FIGS. 9, 10 and 11, equally spaced flat steel bars 186 are bolted to the plastic links 174 and are slidably received on the upper surface of a pair of steel guide tracks 190 (FIG. 9). An endless stretchable conveyor belt 180 (FIGS. 9 and 10) is bolted to the steel bars 186 and includes flexible inwardly angled side walls 184, and upwardly and forwardly angled upstanding cross-bars 192 (FIG. 9) for retaining grapes and raisins on the belt 180 while conveying them upwardly into the discharge conveyor 72 (FIG. 1).

As illustrated in FIG. 2, the discharge conveyor 72 is shown in position over a trellis 103 supported on a trellis post 105 from which a row of grapes or raisins have been harvested and discharged into trucks or bins (not shown). As is conventional in the art, the harvested grapes or raisins fall onto spring loaded plates 104 (FIG. 2) which are resiliently opened in response to contacting the trunks of the grape vines and/or the trellis posts 105 (FIG. 2) and are closed after passing the post due to the forward motion of the grape harvester. As shown in phantom lines in FIG. 4, it is apparent that the tines 64 may be moved to the far left of the vehicle immediately adjacent the left arcuate plastic curtain 95 to harvest grapes or raisins when the body of certain vines are not in alignment with the center of the row. It will also be apparent that the shaker heads 60 and 62 will be automatically guided by the foliage of the plants in the row.

Having further reference to the harvester 30 (FIGS. 1, 2 and 3), the elongated discharge conveyor 72 is pivotally supported by a vertical pivot pin 106 (FIGS. 1 and 8) which permits the discharge conveyor 72 to be swung 90 degrees from a transport position along one side of the harvester 30 and parallel to the longitudinal axis of the harvester when driven between fields and roads or the like.

The shaker heads 60 and 62 (FIG. 4) are enclosed within removable arcuate plastic curtains 95 which cause the grapes or raisins to fall onto inclined surfaces 99 (FIGS. 1 and 5) which guide the grapes or raisins onto the horizontal portions 68 (FIGS. 1 and 5) of the conveying system 66. The spring loaded plates 104 (FIG. 2) also aid in guiding the grapes or raisins into the horizontal portion of the conveyor system 66.

When harvesting, the discharge conveyor 72 is positioned transversely of the longitudinal axis of the harvester as illustrated in FIG. 2. The discharge conveyor frame 98 (FIG. 1, 3 and 8), is pivotally connected to the upper platform 32 of the vehicle by the vertical pivot pin 106 (FIGS. 1 and 8) so that the discharge conveyor 72 may be positioned transversely of the vehicle when harvesting as illustrated in FIG. 2, and be positioned longitudinally of the vehicle when moving to different locations in response to activating hydraulic cylinder 110 (FIGS. 1 and 8).

In order to raise and lower the outer end of the discharge conveyor 72 for discharging grapes and/or raisins into trucks or containers (not shown) of different heights, a forked pivotal connector 114 (FIGS. 2 and 3) is pivotally connected to a lower portion of the discharge conveyor frame 98 by bolts 114a (FIG. 3).

The forked pivotal connector 114 (FIG. 3) includes a forked end portion 115 secured to a large square tube 116 which slidably receives a smaller square tube 117. A hydraulic cylinder 118 has one end portion connected to the large square tube 116 by a bracket 120 welded to the large tube 116. The opposite end of the hydraulic cylinder 118 is connected to the small square tube 117 by a second bracket 121.

As illustrated in FIG. 2, the forked pivotal connector 114 is pivotally connected between the discharge conveyor frame 98 and a bracket 100 (FIG. 2) that is connected to the horizontal pivot pin 114a (FIG. 2). Accordingly, in response to directing hydraulic fluid into the hydraulic cylinder 118 (FIGS. 2 and 3), the outer end of the discharge conveyor 72 may be raised or lowered to the desired elevation for harvesting.

In order to pivot the discharge conveyor 72 between positions parallel to or perpendicular to the longitudinal axis of the grape and raisin harvester 30, the hydraulic cylinder 110 (FIGS. 1 and 8) is pivotally connected between the frame 33 of the harvester and the discharge conveyor frame 98. As illustrated in FIG. 8, when the hydraulic cylinder 110 is fully extended, the discharge conveyor 72 is held in its transport position parallel to the longitudinal axis of the vehicle. When the hydraulic cylinder 110 is fully retracted, as shown in full lines in FIG. 8 the conveyor 72 is normal to the axis of the vehicle.

When in the transport position along one side of the harvester, the forward end of the transverse discharge conveyor 72 (FIG. 1) may be raised or lowered when supported by the forked connector 114 by actuating the hydraulic cylinder 118 (FIG. 3).

As best shown in FIGS. 1, 2 and 4, the shaking heads 60 and 62 (FIG. 4) are each supported by sub-frames 123 and 124 each of which are light weight frames that are pivotally connected between the horizontal upper platform 32 (FIG. 1) and to a lower frame member 119 (FIG. 1) thereby allowing the two shaking heads 60 and 62 to pivot outwardly or inwardly relative to the main frame 33.

An important feature of the invention is that the forward ends of the left and right sub-frames 123 and 124 (FIG. 4) are adjustably connected together by a chain tensioning device 125 which uses a chain 125a to establish a preferred minimum spacing between the tines of the two shaker heads 60 and 62. Also, a tensioning device 125b is connected between the two sub-frames 123 and 124 which allow the tines 64 to move the shaker heads 60 and 62 closer together or farther apart when harvesting small vines or large vines, respectively.

FIG. 5 is a transverse operational section through one shaker head 60 and a portion of a second shaker head 62 with a trellis having a trellis wire (not shown), and further illustrating the controlled path of movement into the longitudinal portion 68 (FIGS. 1 and 5) of the longitudinal conveying system 66 which minimizes the loss of grapes.

The arcuate plastic curtain 95 (FIGS. 4 and 5) and the inclined surfaces of the angled metal plates 99 direct the grapes onto one of the longitudinal conveyor systems 66 which includes the endless stretchable conveyor belt 180 having a plurality of transverse pockets therein (FIGS. 5 and 9). The spring loaded plates 104 are angled into the conveyor 66, and the spring loaded plates 104 are also opened in response to contacting the trellis posts 103 or trunks of the vines in the path of movement of the harvester.

FIG. 6 illustrates a second embodiment of a chain tensioning device 134 in the form of a pivotable diamond shape frame which includes two forward pivot arms 136 pivoted together by a front pin 138, and a second pair of rear arms 140 pivoted together at their ends by a rear pivot pin 142. The outer ends of the arms 136 and 140 are connected together by pivot pins 144 and 146 in order to permit the forward pivot arms 136 and rear pivot arms 140 to be pivoted about the axes of the pivot pins 138, 142, 144, and 146 (FIG. 6).

Sub-flames 148 and 150 (FIG. 6) are journaled about pins 152 and 154, respectively, and have their end portions connected together by a chain 156, the length of which may be adjusted depending upon the size of the grape vines being harvested. A turn buckle 158 (FIG. 6) is connected to a chain 159 (FIG. 6) that is anchored to the pivot pin 142, and its other end is connected to a spring 160 which is attached to the front pin 138. The sub-frames 148,150 (FIG. 6) are pivotally supported by pivot pins 152,154 (FIG. 6) and a transverse rod 155 thereby providing means for moving the tines (not shown) of the shaker head 60a and 62a different distances from the vines.

FIG. 7 diagrammatically illustrates a plurality of positions the shaker heads 60a may assume in relation to the centerline of several grape vines that are not in a linear path.

Having reference to FIG. 8, a pivotal assist mechanism 162 is provided for moving the discharge conveyor 72 between a position parallel to the longitudinal axis of the grape and raisin harvester, and a harvesting position normal to the longitudinal axis of the harvester 30.

The mechanism 162 includes a U-shaped frame 164 which pivotally supports the discharge conveyor frame 98 and conveyor 72 (not shown). One end of the horizontal hydraulic cylinder 110 is pivoted to the harvester's main frame 33 (FIG. 1) by the pivot pin 168. The piston rod of the hydraulic cylinder 110 (FIGS. 1 and 8) is pivotally connected to the U-shaped discharge conveyor frame 98 by the pivot pin 168 (FIGS. 1 and 8), and when hydraulic fluid is directed to the cylinder 110, the discharge conveyor frame 98 will be extended parallel to the longitudinal axis of the harvester as shown in phantom lines in FIG. 8.

FIGS. 9, 10 and 11 illustrate different features of the longitudinal conveying system 66. Each conveyor system 66 includes a plurality of plastic links 172 and 174 which are pivotally connected together by horizontal bolts 176 and 178 (FIG. 9). As illustrated in FIGS. 9, 10 and 11, the stretchable belt 180 has a plurality of grape receiving pockets 182 (FIG. 9 and 10) which have flexible side walls 184 (FIG. 10) that are attached to the endless stretchable belt 180. The belt 180 is attached to a plurality of transverse steel connector strips 186 (FIGS. 10 and 11) by connectors 188. As shown in FIG. 10 the connectors 188 connect the pockets 182 to a belt 180 and to steel connector strips 186. The connectors 188 also ride along steel tracks 190 (FIG. 10) and guide the conveyor 66 through its horizontal and upwardly inclined paths and discharge the grapes and/or raisins on a discharge conveyor 72 (FIG. 1) when harvesting.

The longitudinal conveying systems 66 (FIG. 1) are driven by the hydraulic motor 87 (FIG. 2) which drives both of the longitudinal conveying systems 66 (FIG. 2). The conveying systems 66 includes an upper drive shaft 85 (FIG. 2) having a plurality of driven sprockets 196 and two pairs of wheels 82 keyed thereto. The sprockets 196 mesh with the plastic links 172 and 174 (FIGS. 9, 10 and 11). Short idler shafts 200 (FIG. 5) are journaled in the rear ends of the two horizontal portions 68 of the conveyors 66. As shown in FIG. 2, the two rearward shafts 200 are provided with sprockets 202 which mesh with the chain links 172 (FIG. 9) and are also provided with plastic discs 82 (FIG. 1).

As best shown in FIG. 5, the arcuately shaped plastic curtains 95 and downwardly inclined plates 99 confine the harvested grapes or raisins until they fall onto the horizontal portion 68 of the two conveying systems 66 for subsequent discharge through the outlet or discharge chutes 73 (FIG. 1) onto the transverse discharge conveyor 72. The grapes or raisins are then conveyed into collecting means such as trucks driven along side of the harvester (not shown), into spaced bins (not shown) on the ground that are subsequently picked up by a fork lift truck for loading onto a conventional truck which takes them to market.

From the foregoing description it will be apparent that the self-balancing force balancing radial grape and raisin harvesters of the present invention is adapted to harvest dry grapes which are supported on vines which are harvested as raisins. Alternately, the harvester can harvest ripe grapes still attached to the vines and nourished by the nutrients in the soil and sold as wine grapes or grapes consumed by the public. The shaking heads of the harvester are also self adjustable to harvest grapes from rows that are not planted in straight rows.

Although the best mode contemplated for carrying out the present invention has been herein shown and described, it will be understood that modification and variation may be made without departing from what is regarded to be the subject matter of the invention.

What is claimed is:

1. A self-adjusting mobile force balanced crop harvester for harvesting crops from vines, comprising:
   means defining a generally V-shaped mobile platform movable between rows of vines to be harvested;
   means defining a pair of sub-frames pivotally mounted intermediate the ends thereof on opposite sides of said generally V-shaped mobile platform;
   means defining a pair of oscillating power driven shaker heads pivotally mounted on one end portion of each of said sub-frames and having a plurality of shaker tines projecting radially outward therefrom; and
   adjustable means interconnecting said sub-frames for maintaining a desired spacing between said tines.

2. An apparatus according to claim 1 wherein said adjustable means is a chain connected between end portions of said sub-frames and spaced from said oscillating power driven shaker heads.

3. An apparatus according to claim 1 wherein said adjustable means includes a pivotal diamond shaped frame connected between end portions of said sub-frames and spaced from said oscillating power driven shaker heads.

4. An apparatus according to claim 1 wherein said adjustable linkage means includes four pivot arms pivotally connected together at their pivot points and to said V-shaped sub-frames, and adjustable chain for maintaining a desired tension to limit the inward movement of said oscillating shaker heads.

5. A self-adjusting mobile force balanced crop harvester for harvesting crops from plants, comprising:
means defining a generally V-shaped mobile platform movable between rows of plants to be harvested;
means defining a pair of spaced parallel sub-frames pivotally supporting said shaking heads for pivotal and oscillatory movement about upright axes of said shaking heads, and
adjustable spacing means for maintaining a desired minimum spacing between the tines of said pair of shaking heads.

6. An apparatus according to claim 5 wherein said adjustable spacing means comprises:
an adjustable chain interconnecting said sub-frames for maintaining a desired spacing between the end of the tines; and
a tensioning device for maintaining a desired tension for urging the tines against the plants with a desired force.

7. The apparatus, as claimed in claim 5, further comprising means for adjustably providing tension between the pair of spaced parallel sub-frames.

8. A method for harvesting crops from vines comprising the steps of:
driving a harvester having a main frame over a row of vines supporting crops to be harvested;
pivotally mounting a pair of pivotal sub-frame on said main frame;
mounting a power driven oscillating shaker head having shaker tines thereon projecting outwardly therefrom on each sub-frame for contacting the crops and vines for shaking the crops free from the vines;
connecting said pair of pivotal sub-frames together for maintaining a desired spacing between adjacent tines on each power driven oscillating shaker head a selected distance from each other when harvesting crops; and
collecting the crops for subsequent transfer to a market.

9. In a self-adjusting mobile force balanced crop harvester for harvesting crops from vines, comprising:
an endless conveying system including plurality of plastic links pivotally connected together;
a first plurality of bolts connecting said plastic links together;
a plurality of transversely extending steel strips rigidly secured to spaced links;
an endless stretchable rubber belt supported on said spaced links and having inwardly sloping side walls, and
a plurality of spaced upstanding cross-bars rigidly secured to said stretchable rubber belt supported on said spaced links and having inwardly sloping side walls, and
a plurality of spaced upstanding cross-bars rigidly secured to said stretchable rubber belt for pushing the crops for transfer to a longitudinal discharge conveyor.

10. The apparatus, as claimed in claim 9, wherein the endless conveying system forms a loop with an inside and an outside, and wherein the endless rubber belt is on the outside of the loop and wherein the plastic links are on the inside of the loop.

11. The apparatus, as claimed in claim 10, wherein the endless conveyor conveys the crops in an angled path, with a first section that conveys the crops in a substantially horizontal direction, and a second section which is inclined, and wherein between the first section and the second section the conveyor forms an angle.

12. The apparatus, as claimed in claim 11, further comprising guide tracks adjacent to the endless conveyor where the endless conveyor forms an angle and forming the angle, so that the guide tracks guide the endless conveyor through the angle.

13. A self-adjusting mobile force balanced crop harvester for harvesting crops from plants, comprising:
a pair of shaking heads;
means defining a pair of spaced parallel sub-frames pivotally supporting said shaking heads for pivotal and oscillatory movement about upright axes of said shaking heads, and
adjustable spacing means for maintaining a desired minimum spacing between the tines of said pair of shaking heads.

14. An apparatus, as claimed in claim 13, further comprising a means for centering the plants between the shaking heads, when the plants are not along centered with respect to the harvester, so that the shaking heads place equal forces on the plants.

* * * * *